United States Patent

[11] 3,630,784

[72] Inventors: Wolfgang Kuhn, Frankfurt am Main-Griesheim; Werner Lindner, Niederhochstadt; Gerd Sandstede, Frankfurt am Main, all of Germany
[21] Appl. No.: 659,619
[22] Filed: Aug. 10, 1967
[45] Patented: Dec. 28, 1971
[73] Assignee: Robert Bosch GmbH, Stuttgart, Germany
[32] Priority: Nov. 2, 1966
[33] Germany
[31] B 89654

[54] PREPARATION OF OXYGEN ELECTRODES FOR FUEL CELLS
7 Claims, No Drawings

[52] U.S. Cl. .................................................. 136/120 FC, 75/201, 75/208
[51] Int. Cl. ...................................................... H01m 13/04, B22f 7/00
[50] Field of Search ............................................. 136/120; 75/208, 201; 264/22, 49, 112, 113, 127

[56] References Cited

UNITED STATES PATENTS

| | | | |
|---|---|---|---|
| 3,341,936 | 9/1967 | Sanstede et al. | 136/86 X |
| 3,382,067 | 5/1968 | Sandstede et al. | 136/120 X |
| 3,395,049 | 7/1968 | Thompson | 136/86 X |
| 3,385,780 | 5/1968 | I-Ming Feng | 136/120 |

*Primary Examiner*—Winston A. Douglas
*Assistant Examiner*—M. J. Andrews
*Attorneys*—Fritz G. Hochwald and Christen & Sabol ABSTRACT: Two layers where each contains a skeleton-forming fluorine-containing resin and only the first layer contains silver carbonate are pressed together to a disc. At least the first layer contains a water-soluble salt which is leached out to form pores. The silver carbonate is reduced to catalytically active metallic silver. In the obtained electrode, the first silver-containing layer is electrically conductive and wettable by the electrolyte, the second layer is hydrophobic and its pores suitable to retain the oxygen.

PREPARATION OF OXYGEN ELECTRODES FOR FUEL CELLS

This invention relates to the preparation of silver-containing cathodes for fuel cells.

For operating fuel cell cathodes (oxygen electrodes) with alkaline electrolytes, silver has been a preferred catalyst. The silver can be employed as powder or in form of a powdered Raney alloy with aluminum which is later dissolved out, or as a compound which is decomposed at sintering temperature (German DAS No. 1,174,861) and formed to a sintered body (German Pat. No. 1,197,941). Thereby, the silver consumption is rather high. The silver content can be reduced by mixing the silver with another metal, e.g., nickel, in form of powders and to sinter the mixture to a porous body (U.S. Pat. No. 3,020,327). Such electrodes have a high weight, and on sintering undesirable alloy formation may take place which reduces the activity.

It is also known to incorporate silver or a Raney silver alloy as powder in a resin matrix; this can be done by mixing the silver or Raney alloy with a powdered or granular resin and pressing the mass (U.S. Pat. No. 3,134,697; French Pat. No. 1,397,092; German DAS No. 1,219,105) or by forcing suspended catalyst particles into a porous matrix (U.S. Pat. No. 3,171,737; British Pat. No. 986,324). Thereby, the use of Raney silver has particular advantages due to the large inner surface of the spongy material. However, the preparation of the catalyst is complicated, the disintegration of the ductile alloys is often difficult, and the catalyst, before or after it has been formed, must be activated by leaching out the aluminum.

According to various procedures, porous bodies of carbon or electrically nonconductive materials can be impregnated with solutions of silver salts whereupon the silver is chemically reduced or electrolytically precipitated (German DAS No. 1,171,482; British Pat. Nos. 995,903 and 986,324). Said impregnating methods present the advantage that the silver is deposited in finely divided form in the matrix but they have the drawback to render the entire matrix, even though it consists of difficulty wettable material, wettable and hydrophilic so that it can be utilized only under pressure as a gas electrode.

The reason is that in fuel cells for free (liquid) electrolyte and gaseous fuels, the electrolyte must not enter the gas space through the pores of the electrode. This can be accomplished by applying a sufficiently high gas pressure, or more simply by rendering the layer of the electrode which faces the gas space, water (i.e. electrolyte) repellent. However, the catalyst-containing layer must remain accessible for the electrolyte to permit the ions formed in the electrochemical reaction to pass into the electrolyte. Methods to impregnate porous bodies with suitable materials (paraffin, hydrophobic polymers) are known; however, when only part of the body is to be impregnated, they require a careful and complicated procedure.

A primary object of the invention is to provide a simple method for preparing a porous electrode one part of which is electrically conductive, contains a catalyst and is wettable by the electrolyte while another contiguous part is nonwettable and filled with gas.

Other objects and advantages will be apparent from a consideration of the specification and claims.

According to the invention, these objects are accomplished by joining an electrical conductivity ensuring mixture of powders of silver carbonate, a fluorine-containing resin, and one or more water soluble salts under heat and pressure with a layer which consists only of a fluorine-containing resin or of a mixture of such resin with a water soluble salt, to a disc and making the disc catalytically active by reducing the silver carbonate with hydrogen and porous by leaching out the salts. With respect to metallic silver, which could also be used, the silver carbonate has the advantage that, on reduction, an additional system of micropores is formed, which renders the catalyst particularly active. In addition, the carbonate reacts with the resin at least at the contact points of the powder particles. For the proper operation of the electrodes prepared in accordance with the invention, it is of importance that the catalyst-containing layer, though consisting largely of hydrophobic material, is, by the formed silver and additionally by the interaction with the carbonate at sintering temperature, made wettable by the electrolyte to such an extent that the catalyst can take part in the electrochemical reaction, while the back of the electrode which consists only of resin, remains completely unwettable and filled in all pores with oxygen or air.

Thereby, it is surprising that the fluorine containing decomposition products of the resin, which may be formed in the sintering operation, do not convert the silver to silver fluoride and deactivate it, but that said finely distributed metal imparts to the mass a high electric conductivity.

If, due to the use of an insufficient amount of silver carbonate, the conductivity of the mass remains too small, an alkali-resistant conductive component, e.g., nickel powder, can be added to the mixture of the starting materials to bring the conductivity to the desired level.

The preparation of the electrodes will be described in detail with reference to the examples 1 to 4.

The active layer of the electrode consists of a mixture of powders of a fluorine containing, i.e. hydrophobic, resin, silver carbonate, and a water soluble pore-forming material. If desired, an alkali-resistant conductive substance may be added.

By grinding in a mortar, the powders are mixed for a sufficient period of time that a ductile scaly mass is obtained which is then evenly distributed in a die cavity. On this layer, the mixture of the back layer is spread, which mixture contains pore-forming agents and resin powder (examples 1 and 2). The mixtures are compressed under a pressure of 1–3 Mp./cm.$^2$ to a shaped body.

If the backlayer is to be prepared without a pore forming agent (examples 3 and 4), we prepare first under a pressure of 1 to 3 Mp./cm.$^2$ a pressed body only of the front layer, whose one face is roughened. The resin powder evenly spread on said roughened surface is then compressed under a pressure of 1 to 5 kp./cm.$^2$ only so far that about 50 percent by volume of pores are still contained in the mass.

Thereby, a preformed wire of an alkali-resistant material, e.g., silver, can be also pressed into the front layer, to produce a better contact of the electrode.

The satisfactorily coherent pressed body is placed between porous ceramic discs and loaded with a weight of about 300 g. During 1 hour, the silver carbonate is reduced at a temperature of 200° C. in a hydrogen atmosphere to metallic silver; subsequently, the temperature is increased to 370° C. so as to sinter the resin particles together. At the same time, the silver catalyst particles sinter together and form a conductive skeleton in the electrode body.

If, as described in example 4, polytrifluorochloroethylene is used as the skeleton material, a temperature of 270° C. is sufficient for the sintering of the resin but not for the bonding of the silver particles. For this reason, a very fine nickel powder is added so as to produce mechanically as many bridges between the individual catalyst particles as possible.

Finally, the pore forming agent is leached out of the activated and sintered electrode discs with water, the temperature of which may be increased to boiling, and the electrode is dried.

As shown in example 4, sodium carbonate can be incorporated into the active layer as pore forming agent. This is of advantage because the sodium carbonate reacts on sintering with the fluorine containing resin. The resin is so modified as to lose its hydrophobic character and to allow the electrolyte to penetrate into the active front layer. The porous hydrophobic back layer of the electrode, which serves also as supporting layer, ensures access of the oxidizing agent (oxygen, air) to the catalyst for the electric reaction.

The thus prepared electrodes can be operated in test cells or batteries in the presence of an alkaline electrolyte at temperatures up to 200° C.

Particularly for operation with oxygen contained in air, the supporting layer must be of such thickness, and its pores must be of such size that said supporting layer will have the required strength and be impermeable to the electrolyte, because a pore system, which is too narrow, would retain a nitrogen cushion which would interfere with the oxygen access.

EXAMPLE 1

Into a die cavity of 24 mm. diameter, there are sequentially placed the following mixtures:

1. 2.0 g. of a mixture consisting by volume of
   45 percent of silver carbonate, grain size <5 $\mu$m.
   25 percent of polytetrafluoroethylene, grain size <45 $\mu$m.
   30 percent of sodium chloride, grain size 30–60 $\mu$m.
2. 1.5 g. of a mixture consisting by volume of
   30 percent of polytetrafluoroethylene, grain size <45 $\mu$m.
   70 percent of sodium chloride, grain size 30–60 $\mu$m.

The mass is compressed under a pressure of 3 Mp./cm.$^2$. The pressed body is placed between ceramic discs and loaded with a weight of 300 g. The silver carbonate is reduced for 1 hour in a hydrogen atmosphere at 200° C. to silver. Subsequently, the body is sintered for 2 hours at 370° C.

The electrode contains 240 mg./cm.$^2$ of silver. After leaching out the pore-forming agent in water, the temperature of which may be increased to boiling, the electrode is tested in a half-cell arrangement with oxygen (air) as fuel without applying pressure. When 6.5 $n$ KOH at 70° C. is used as electrolyte, the electrode with reference to a hydrogen electrode in the same electrolyte produces the following voltages:

|        | Open-circuit voltage | 50 ma./cm.$^2$ | 100 ma./cm.$^2$ |
|--------|----------------------|----------------|-----------------|
| Oxygen | 1,080 mv.            | 920 mv.        | 830 mv.         |
| Air    | 1,060 mv.            | 800 mv.        | 640 mv.         |

EXAMPLE 2

Into a die cavity, as described in example 1, the following three mixtures are filled one after the other:

1. 0.7 g. of a mixture consisting by volume of
   80 percent silver carbonate, grain size <5 $\mu$m.
   20 percent polytetrafluoroethylene, grain size <45 $\mu$m.
2. 1.5 g. of a mixture consisting by volume of
   40 percent silver carbonate, grain size <5 $\mu$m.
   25 percent polytetrafluoroethylene, grain size <45 $\mu$m.
   35 percent sodium sulfate, grain size 30–60 $\mu$m.
3. 1.5 g. of a mixture consisting by volume of
   30 percent polytetrafluoroethylene, grain size <45 $\mu$m.
   70 percent sodium sulfate, grain size 30–60 $\mu$m.

The mass is treated as described in example 1. On reduction of the silver carbonate, the front layer (1) develops very fine pores which, due to the capillary forces, fill well with electrolyte. The middle layer (2), which contains additionally large pores, is a quasi-transition to the hydrophobic back layer (3) which does not contain a catalyst.

The layers (1) and (2) have a combined content of 280 mg./cm.$^2$ of silver. In a half-cell arrangement as in example 1, the following voltages for oxygen and air at 3–5 cm. water column above atmospheric pressure in 6.5 $n$ KOH and 70° C. are measured:

|        | Open-circuit voltage | 50 ma./cm.$^2$ |
|--------|----------------------|----------------|
| Oxygen | 1,070 mv.            | 910 mv.        |
| Air    | 1,040 mv.            | 790 mv.        |

EXAMPLE 3

In a die cavity of 48 mm. diameter, there are placed sequentially:

1. About 2 g. of sodium chloride, grain size <30 $\mu$m.
2. 8.0 g. of a mixture consisting by volume of
   45 percent silver carbonate, grain size <5 $\mu$m.
   25 percent polytetrafluoroethylene, grain size <45 $\mu$m.
   30 percent sodium chloride, grain size 30–60 $\mu$m.

The mass is pressed under a pressure of 1 Mp./cm.$^2$ and the ram is removed from the die. A backlayer (3) which consists of (3) 2.0 g. of polytetrafluoroethylene, grain size <45 $\mu$m. and does not contain a pore former, is loosely spread on the prepressed and roughened silver-containing layer (2), and then pressed thereon under a pressure of 5 kp./cm.$^2$. This pressure is low enough to compact the polytetrafluoroethylene layer to about 50 percent.

As described in example 1, the obtained matrix is activated, sintered, and the sodium chloride of the base layer as well as the pore former are leached out. In a half-cell assembly as in example 1, the following potentials in 6.5 $n$ KOH at 70° C. are measured when the electrode, which contain 240 mg./cm.$^2$ of silver, is operated without application of pressure:

|        | Open-circuit potential | 50 ma./cm.$^2$ |
|--------|------------------------|----------------|
| Oxygen | 1,080 mv.              | 920 mv.        |
| Air    | 1,060 mv.              | 810 mv.        |

EXAMPLE 4

Into a heatable die of 48 mm. diameter, there are filled sequentially:

1. 10.0 g. of a mixture containing by volume
   20 percent silver carbonate, grain size <5 $\mu$m.
   25 percent polytrifluorochloroethylene powder, grain size $\simeq$ 20 $\mu$m.
   25 percent nickel powder, grain size 1–5 $\mu$m.
   15 percent sodium chloride, grain size 30–60 $\mu$m.
   15 percent sodium carbonate, grain size 30–60 $\mu$m.
2. 2.0 g. of polytrifluorochloroethylene powder, grain size $\sim$ 20 $\mu$m.

The catalyst containing layer (1) is first pressed under a pressure of 1 Mp./cm.$^2$. After removal of the ram, the powder (2) for the backlayer is spread on layer (1) and pressed thereon under a pressure of 5 kp./cm.$^2$. The pressed body is sintered for 1 hour at 270° C. while said pressure of 5 kp./cm.$^2$ is maintained.

The silver carbonate is then at 150° C. during 5 hours reduced in a hydrogen atmosphere to active silver. The pore formers sodium chloride and sodium carbonate are leached out with warm water. The electrode contains 100 mg./cm.$^2$ of silver.

The sodium carbonate is added as pore former to the sodium chloride because it reacts in direct vicinity with the polytrifluorochloroethylene; hereby the resin skeleton loses its hydrophobic character, and the active layer is better wetted by the electrolyte.

In a half-cell arrangement as in example 1, the electrode when operated without application of pressure with oxygen (air) in 6.5 $n$ KOH at a temperature of the electrolyte of 80° C., produces the following potentials:

|        | Open-circuit potential | 50 ma./cm.$^2$ |
|--------|------------------------|----------------|
| Oxygen | 1,070 mv.              | 860 mv.        |
| Air    | 1,050 mv.              | 730 mv.        |

In the examples, the abbreviation "p" designates "pond," the latter term being introduced in the European physical literature to define the unit of force and to replace insofar the formerly used "gram." Therefore, "kp."=kilogram and "Mp." = metric ton.

We claim:
1. A method for preparing a porous oxygen electrode for fuel cells operated with an alkaline electrolyte comprising forming at least one active substantially hydrophobic layer of a potentially electrically conductive mixture of powders of silver carbonate, a fluorine containing resin, and at least one water-soluble salt other than silver carbonate, forming on said active layer a substantially hydrophobic supporting layer of a member of the group consisting of a fluorine-containing resin and a mixture of said resin with at least one water-soluble salt other than a carbonate, compressing said layers to form a disc, reducing the silver carbonate in said disc to catalytically active metallic silver and sintering said disc to render said active layer electrically conductive and electrolyte wettable, said supporting layer remaining substantially hydrophobic, and leaching out the water-soluble salts to render the disc porous.

2. The method as claimed in claim 1 wherein said fluorine-containing resin is polytetrafluoroethylene.

3. The method as claimed in claim 1 wherein said fluorine-containing resin is polytrifluorochloroethylene.

4. The method as claimed in claim 1 wherein said powder mixture contains 10 to 50 percent by volume of silver carbonate and 15 to 50 percent by volume of said resin.

5. The method as claimed in claim 1 wherein two superposed active layers are formed and the contents of silver carbonate and of said resin in said two active layers are different.

6. The method as claimed in claim 1 comprising adding to said powder mixture an electrically conductive substance.

7. The method as claimed in claim 1 comprising initially compressing said active layer to form a pressed body, applying said supporting layer and compressing said layer and said body at a pressure less than that used in forming said pressed body to form said disc.

* * * * *